(12) United States Patent
Duff

(10) Patent No.: US 10,053,078 B2
(45) Date of Patent: Aug. 21, 2018

(54) METHODS, SYSTEMS, AND APPARATUS TO TEST A VEHICLE BRAKE SYSTEM

(71) Applicant: Honda Motor Co., Ltd., Minato-ku, Tokyo (JP)

(72) Inventor: Douglas J Duff, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 241 days.

(21) Appl. No.: 14/814,270

(22) Filed: Jul. 30, 2015

(65) Prior Publication Data
US 2017/0028977 A1 Feb. 2, 2017

(51) Int. Cl.
*B60T 17/22* (2006.01)
*G07C 5/08* (2006.01)
*G01B 5/00* (2006.01)

(52) U.S. Cl.
CPC .......... *B60T 17/221* (2013.01); *G01B 5/0028* (2013.01); *G07C 5/0825* (2013.01); *B60T 2270/406* (2013.01)

(58) Field of Classification Search
CPC .. B60T 17/221; B60T 2220/04; G01B 5/0028
See application file for complete search history.

(56) References Cited

U.S. PATENT DOCUMENTS

| | | | |
|---|---|---|---|
| 3,662,593 A * | 5/1972 | Pirrello | B60T 17/223 254/DIG. 5 |
| 3,899,916 A * | 8/1975 | Cline | G01L 5/225 73/126 |
| 3,987,557 A | 10/1976 | Valentine | |
| 4,024,756 A * | 5/1977 | Cline | G01L 5/282 73/132 |
| 4,604,718 A | 8/1986 | Norman et al. | |
| 4,797,104 A | 1/1989 | Laerdal et al. | |
| 4,893,242 A * | 1/1990 | Rogers | G01L 5/282 701/70 |
| 4,974,164 A | 11/1990 | Lewis et al. | |
| 5,305,636 A * | 4/1994 | Balsarotti | G01L 5/28 73/121 |
| 5,467,646 A * | 11/1995 | Douine | G01L 5/282 73/116.06 |
| 5,677,772 A | 10/1997 | Nakajima | |

(Continued)

FOREIGN PATENT DOCUMENTS

JP 2005121419 A * 5/2005

OTHER PUBLICATIONS

Y. Gao, "DOE Hybrid and Electric Vehicle Test Platform," Advanced Vehicle Research Center, Jun. 2012.*

*Primary Examiner* — Peter D Nolan
(74) *Attorney, Agent, or Firm* — Arent Fox LLP

(57) ABSTRACT

According to one aspect, a method includes receiving, in a dynamometer, brake pedal position information. The brake pedal position information indicates a position of a brake pedal operatively coupled to a vehicle. The method also includes displaying, via a display in communication with the dynamometer, an indication of the position of the brake pedal based on the brake pedal position information. The method further includes determining a brake force generated via a brake of the vehicle when the position of the brake pedal is within a predetermined range of brake pedal positions.

17 Claims, 9 Drawing Sheets

(56) References Cited

U.S. PATENT DOCUMENTS

| | | | |
|---|---|---|---|
| 6,188,948 B1 * | 2/2001 | Shivler, Jr. | G01L 5/282 701/70 |
| 6,257,054 B1 * | 7/2001 | Rostkowski | G01L 3/22 73/116.08 |
| 6,457,351 B1 * | 10/2002 | Yamamoto | G01M 17/0072 73/116.05 |
| 6,457,352 B1 * | 10/2002 | Knestel | G01M 17/0072 73/117.03 |
| 6,736,003 B2 * | 5/2004 | Takeda | G01N 19/02 73/132 |
| 6,754,568 B1 * | 6/2004 | Ripley | G01L 5/28 340/453 |
| 7,039,541 B2 * | 5/2006 | Grunbacher | G01M 15/044 701/32.8 |
| 7,203,602 B2 * | 4/2007 | Michaelis | G01M 17/0072 702/41 |
| 7,493,805 B2 * | 2/2009 | Ben-David | G01L 5/282 73/117.02 |
| 7,584,654 B2 * | 9/2009 | Seibl | G01L 5/282 73/123 |
| 7,752,903 B2 * | 7/2010 | Seibl | G01L 5/282 73/123 |
| 7,784,335 B2 | 8/2010 | Fukamachi et al. | |
| 9,223,748 B2 * | 12/2015 | Konishi | G06F 17/00 |
| 2002/0091471 A1 * | 7/2002 | Suzuki | G01M 15/02 701/32.9 |
| 2003/0079529 A1 * | 5/2003 | Leep | G01M 17/0074 73/116.06 |
| 2004/0000191 A1 * | 1/2004 | Ben-David | G01L 5/282 73/116.06 |
| 2004/0181356 A1 * | 9/2004 | Grunbacher | G01M 15/044 702/113 |
| 2004/0220755 A1 * | 11/2004 | Michaelis | G01M 17/0072 702/41 |
| 2006/0078852 A1 | 4/2006 | Limkemann | |
| 2008/0022761 A1 * | 1/2008 | Seibl | G01L 5/282 73/126 |
| 2008/0028845 A1 * | 2/2008 | Seibl | G01L 5/282 73/123 |
| 2011/0143320 A1 | 6/2011 | McCormick et al. | |
| 2013/0190997 A1 * | 7/2013 | Konishi | G06F 17/00 701/68 |
| 2014/0113271 A1 | 4/2014 | Elder | |
| 2016/0195444 A1 * | 7/2016 | Benvenuti | B66F 7/065 73/122 |

\* cited by examiner

METHODS, SYSTEMS, AND APPARATUS TO TEST A VEHICLE BRAKE SYSTEM

BACKGROUND

The subject matter disclosed herein relates to vehicle tests and, more particularly, to methods, systems, and apparatus to test a vehicle brake system.

During manufacturing of a vehicle, components of the vehicle are tested to determine if the components function in accordance with industry and/or quality standards. For example, turn signals, windshield wipers, a steering system, brakes, an engine, and/or other components may be tested. Traditionally, some of the components are tested using a dynamometer, which provides prompts to a driver of the vehicle to operate the components of the vehicle. For example, the dynamometer may provide a prompt instructing the driver to accelerate the vehicle until the speedometer indicates a predefined speed. The dynamometer may then determine the speed of the vehicle. In some instances, known dynamometers prompt the driver to operate the brakes of the vehicle to verify speedometer operation, and the driver moves a brake pedal of the vehicle to a fully actuated position. The dynamometer may then determine a brake force generated by the brakes of the vehicle when the brake pedal is in the fully actuated position.

SUMMARY

According to one aspect, a system includes a first diagnostic computing device. The system also includes a second diagnostic computing device to be in communication with the first diagnostic computing device and a computing device of a vehicle. The second diagnostic computing device is to communicate brake pedal position information to the first diagnostic computing device. The system further includes a display in communication with the first diagnostic computing device. The display is to indicate a position of a brake pedal of the vehicle based on the brake pedal position information.

According to another aspect, a method includes receiving, in a dynamometer, brake pedal position information. The brake pedal position information indicates a position of a brake pedal operatively coupled to a vehicle. The method also includes displaying, via a display in communication with the dynamometer, an indication of the position of the brake pedal based on the brake pedal position information. The method further includes determining a brake force generated via a brake of the vehicle when the position of the brake pedal is within a predetermined range of brake pedal positions.

According to yet another aspect, a diagnostic computing device includes an input module to receive brake pedal position information. The diagnostic computing device also includes an output module to transmit a signal to a display to display an indication that a position of a brake pedal of a vehicle is within a predetermined range of brake pedal positions.

BRIEF DESCRIPTION OF THE DRAWINGS

Like reference numerals are used herein to refer to like components and/or systems.

DETAILED DESCRIPTION

Example methods, systems, and apparatus disclosed herein may be used to test a brake system of a vehicle. In some embodiments, the vehicle is supported on a plurality of rollers of a dynamometer. To test the brake system of the vehicle, a driver actuates a brake pedal of the vehicle. While the brake pedal is actuated, the dynamometer urges one or more wheels of the vehicle to rotate by applying a torque to the one or more wheels via the rollers. The rollers may slip or move relative to the wheels, and the dynamometer determines a force applied by the brakes ("a brake force") to the one or more wheels based on the torque employed via the rollers.

The example methods, systems, and apparatus disclosed herein enable the brake forces to be determined when the brake pedal is positioned in one or more predetermined ranges of brake pedal positions. For example, the brake test system may include a display to display an indication of the position of the brake pedal relative to a predetermined range of brake pedal positions. The driver may view the display and adjust the position of the brake pedal to a position within the predetermined range based on the indication displayed via the display. Then, once the brake pedal is in the position within the predetermined range, the dynamometer may determine the force applied by the brakes to the wheels of the vehicle. As a result, the methods, systems, and apparatus disclosed herein enable brake tests to be accurately and consistently conducted when the brake pedal is positioned within any desired range of brake pedal positions. Thus, for example, brake tests may be conducted using the example methods, systems, and apparatus disclosed herein when the brake pedal is within a first predetermined range of brake pedal positions, a second predetermined range of brake pedal positions, a third predetermined range of brake pedal positions, etc. In some embodiments, the predetermined range of brake pedal positions does not include a fully unactuated position and/or a fully actuated position of the brake pedal. Thus, the methods, systems, and apparatus disclosed herein enable improved brake tests to be conducted on vehicles compared to traditional methods, systems, and apparatus used to test brakes.

Figure 1:
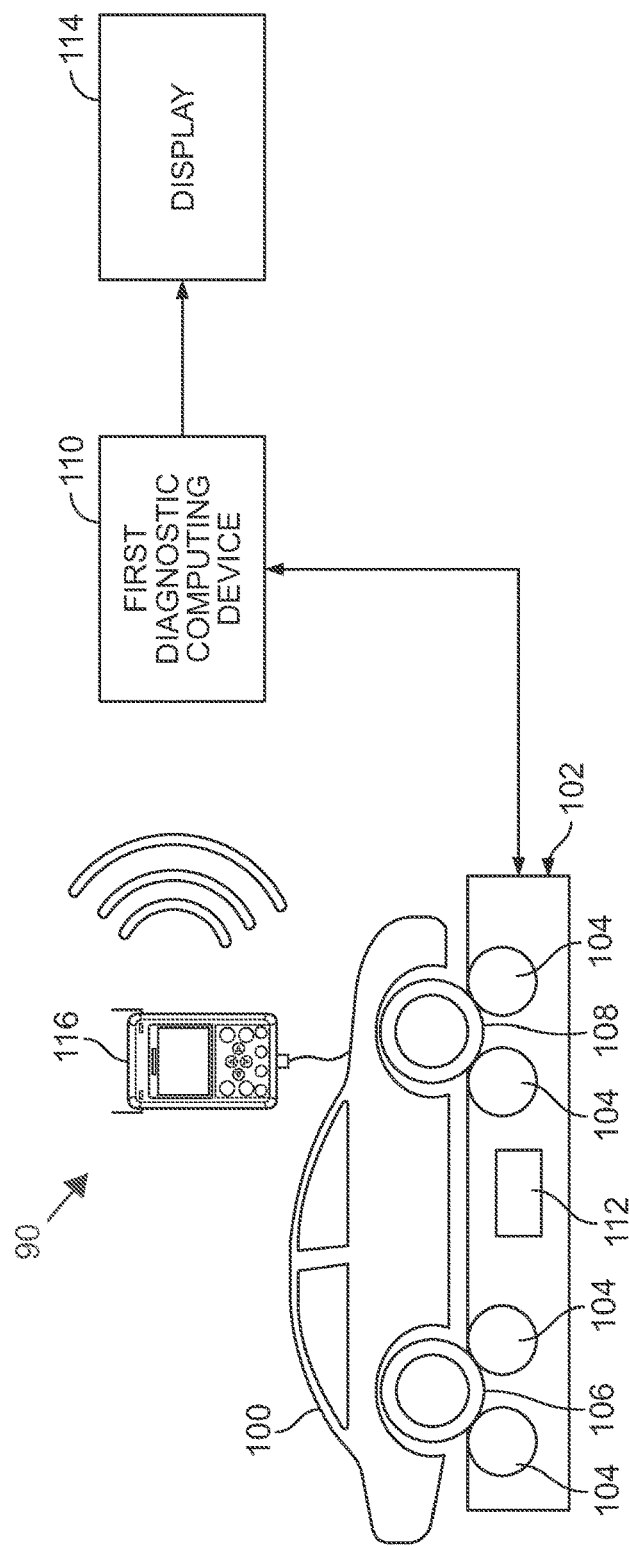
FIG. 1 is a schematic view of a vehicle supported by rollers of a dynamometer in accordance with the teachings of this disclosure.

FIG. 1 is a schematic view of an exemplary embodiment of a brake test system 90 for testing a brake system of a vehicle 100. In the embodiment of FIG. 1, the brake test system 90 includes a dynamometer 102. In this embodiment, the vehicle 100 is an automobile such as, for example, a car. In other embodiments, the vehicle 100 is another type of vehicle such as, for example, a truck, a bus, a van, a go-cart, a motorcycle, a scooter, a bicycle, an all-terrain vehicle ("ATV"), a heavy equipment vehicle (e.g., a bulldozer, a crane, a combine, a tractor, a forklift, an asphalt paver, and/or any other heavy equipment vehicle), and/or any other type of vehicle. In the shown embodiment, the dynamometer 102 is a chassis dynamometer such as, for example, a four-wheel multi-drive tester. In other embodiments, other types of dynamometers are employed (e.g., a two-wheel dynamometer). The dynamometer 102 of FIG. 1 includes rollers 104 to support the vehicle 100. In this embodiment, respective pairs of rollers 104 support each rear wheel 106 and each front wheel 108 of the vehicle 100. The rollers 104 are rotatable such that the rollers 104 may permit the front wheels 108 and/or the rear wheels 106 to rotate, prevent the front wheels 108 and/or the rear wheels 106 from rotating, and/or urge the front wheels 108 and/or the rear wheels 106 to rotate when the vehicle 100 is supported on the rollers 104.

The dynamometer 102 of FIG. 1 includes a first diagnostic computing device 110. The first diagnostic computing device 110 may control operation of the dynamometer 102. For example, the first diagnostic computing device 110 of FIG. 1 is operatively coupled to the rollers 104 to control the rollers 104. For example, the first diagnostic computing device 110 may be communicatively coupled to a roller motor and/or brake system 112 of the dynamometer 102. The roller motor and/or brake system 112 may receive signals from the first diagnostic computing device 110 and, in response to the signals, permit, resist, prevent, and/or urge rotation of the rollers 104 via one or more mechanical devices (e.g., clutches, gears, etc.) coupling the roller motor and/or brake system 112 to the rollers 104.

In the embodiment shown, the first diagnostic computing device 110 is communicatively coupled to a display 114. The display 114 of FIG. 1 is to be visible to a driver seated in the vehicle 100. In some embodiments, the display 114 is disposed inside the vehicle 100. In other embodiments, the display 114 is disposed outside of the vehicle 100. The display may be, for example, a light or a plurality of lights, a computer monitor, a television screen, a display of a handheld device (e.g., a smartphone, a laptop, a tablet, etc.), a dashboard display, and/or any other type of display.

The first diagnostic computing device 110 is communicatively coupled to a second diagnostic computing device 116. In this embodiment, the second diagnostic computing device 116 is wirelessly communicatively coupled to the first diagnostic computing device 110. In other embodiments, the second diagnostic computing device 116 is communicatively coupled to the first diagnostic computing device 110 via one or more wires. In the embodiment shown, the second diagnostic computing device 116 is a line-end tester. In other embodiments, the second diagnostic computing device 116 is another suitable type of diagnostic computing device. The second diagnostic computing device 116 is communicatively coupled to a vehicle computer 300 (FIG. 3) such as, for example, an engine control unit ("ECU"). In some embodiments, the second diagnostic computing device 116 is communicatively coupled to the vehicle computer 300 via, for example, a communication bus and/or in another suitable manner.

Figure 2:
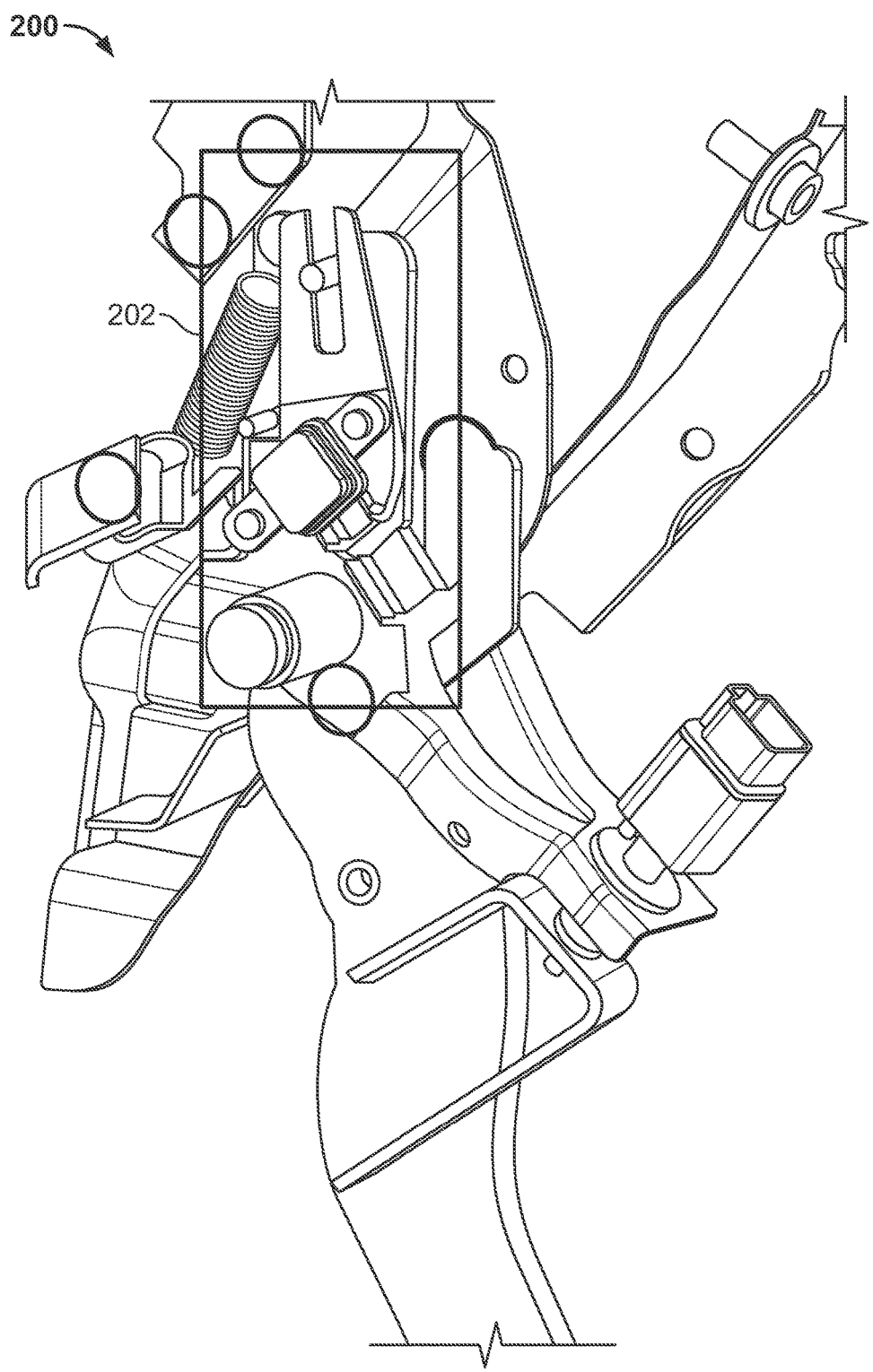
FIG. 2 is a perspective view of a portion of a brake pedal assembly that may be used to implement the embodiments disclosed herein.
Figure 3:
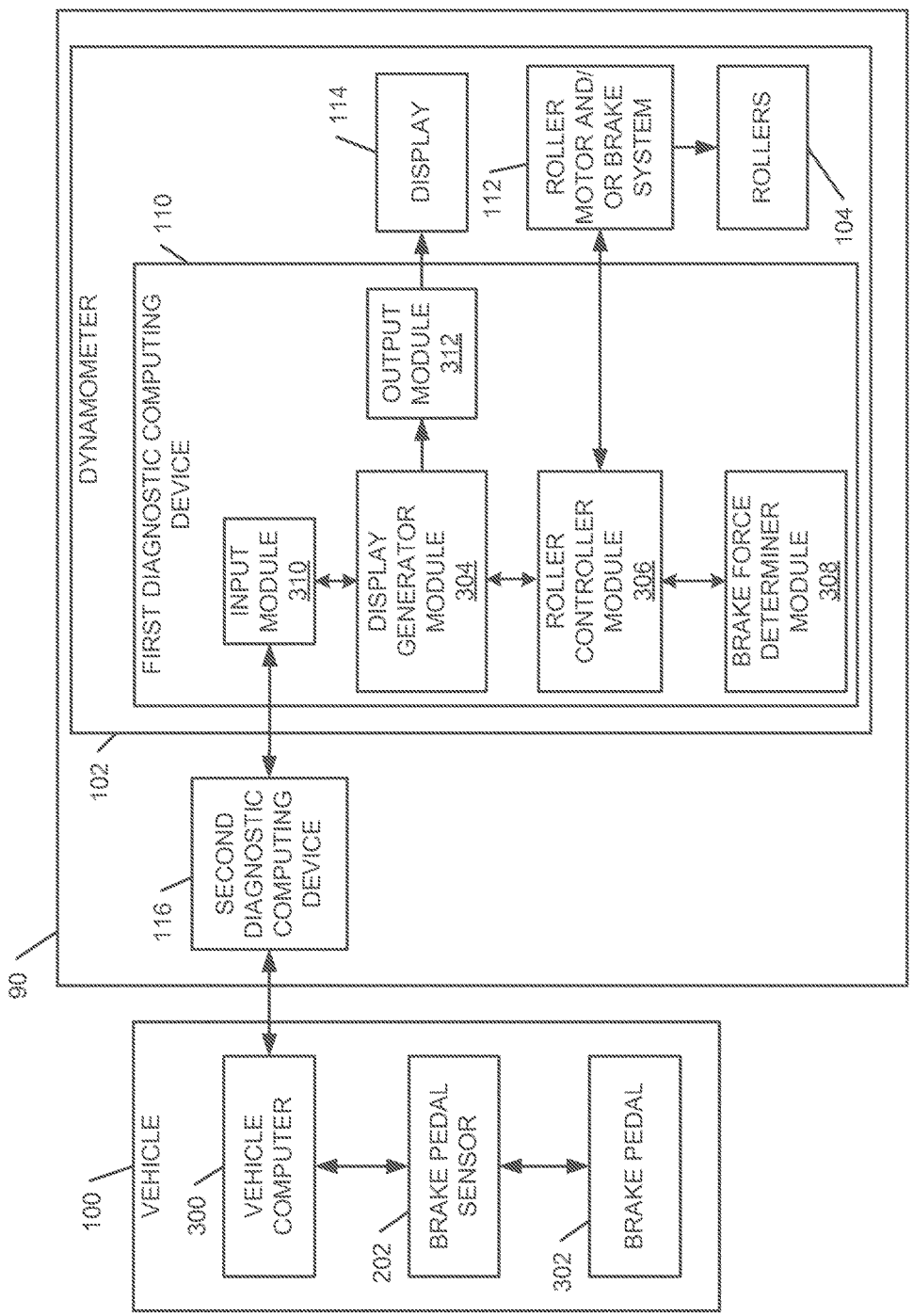
FIG. 3 is a block diagram illustrating an exemplary brake test system disclosed herein.

FIG. 2 shows a portion of a brake pedal assembly 200 including a brake pedal sensor 202, which may be used to implement the apparatus, systems, and methods disclosed herein. The brake pedal assembly 200 may include, but is not limited to, a brake pedal, a brake actuator, a brake applicator, and/or one or more additional and/or alternative components. In this embodiment, the brake pedal assembly 200 actuates electro servo brakes operatively coupled to the wheels 106, 108 via a brake pedal 302 (FIG. 3). In other embodiments, the brake pedal assembly 200 may be used to actuate other types of brakes. As described in greater detail below in conjunction with FIG. 3, the brake pedal sensor 202 communicates brake pedal position information to the vehicle computer 300.

FIG. 3 is a block diagram of an exemplary embodiment of the brake test system 90 shown in FIG. 1. In the embodiment shown, the brake test system 90 includes the dynamometer 102 and the second diagnostic computing device 116. In this embodiment, the vehicle 100 includes a vehicle computer 300, the brake pedal sensor 202, and a brake pedal 302. The brake pedal 302 is operatively coupled to one or more brakes of the vehicle 100 via the brake pedal assembly 200. In this embodiment, the vehicle computer 300 receives information indicative of positions of the brake pedal 302 ("brake pedal position information") from the brake pedal sensor 202.

In some embodiments, the vehicle computer 300 controls one or more components of the vehicle 100 and/or monitors inputs and/or outputs of one or more components and/or systems of the vehicle 100. For example, the vehicle computer 300 may control firing of spark plugs, opening and closing of fuel injectors, opening and closing of valves, operation of a cooling fan, and/or one or more additional and/or alternative components of the vehicle 100. In some embodiments, the vehicle computer 300 receives signals conveying information from one or more sensors such as, for example, temperature information from temperature sensors, air-to-fuel ratios from air-to-fuel ratio sensors, crankshaft position information from crankshaft position sensors, mass flow rate information from mass airflow (MAF) sensors, pressure information from pressure sensors, throttle position information from throttle position sensors, speed information from vehicle speed sensors, and/or information from one or more additional and/or alternative sensors. In some embodiments, the vehicle computer 300 processes information received from one or more sensors. For example, the vehicle computer 300 may convert analogue signals to digital signals, filter noise, generate wireless signals, encode information (e.g., compress information), and/or process information in one or more additional and/or alternative ways.

In the embodiment shown in FIG. 3, the vehicle computer 300 communicates the brake pedal position information to the second diagnostic computing device 116. In some embodiments, the second diagnostic computing device 116 communicates a request for the brake pedal position information to the vehicle computer 300, and the vehicle computer 300 communicates the brake pedal position information in response to the request. In some embodiments, the vehicle computer 300 automatically communicates the brake pedal position information to the second diagnostic computing device 116. The vehicle computer 300 may automatically communicate the brake pedal position information periodically, when one or more conditions are met (e.g., actuation of the brake pedal 302), and/or in real time (i.e., without an intentional delay).

The second diagnostic computing device 116 receives information from the vehicle computer 300, tests and/or evaluates one or more components and/or systems of the vehicle 100 based on the information and/or communicates information to the first diagnostic computing device 110 of the dynamometer 102. In the embodiment shown, the second diagnostic computing device 116 communicates the brake pedal position information to the dynamometer 102. In some embodiments, the second diagnostic computing device 116 communicates the brake pedal position information to the first diagnostic computing device 110 in response to a request from the first diagnostic computing device 110. In some embodiments, the second diagnostic computing device 116 automatically communicates the brake pedal position information to the first diagnostic computing device 110. For example, the second diagnostic computing device 116 may automatically communicate the brake pedal position information to the first diagnostic computing device 110 periodically, when one or more conditions are met (e.g., actuation of the brake pedal 302), and/or in real time (i.e., without an intentional delay). In some embodiments, the second diagnostic computing device 116 processes the brake pedal position information to facilitate communication of the brake pedal position information to the first diagnostic computing device 110. For example, the second diagnostic computing device 116 may convert analog signals to digital signals, filter noise, generate wireless signals, encode information conveyed via the signals (e.g., compress information), and/or process the brake pedal position information in one or more additional and/or alternative ways.

In the embodiment shown in FIG. 3, the dynamometer 102 includes the first diagnostic computing device 110, the display 114, the roller motor and/or brake system 112, and the rollers 104. The first diagnostic computing device 110 includes a display generator module 304, a roller controller module 306, a brake force determiner module 308, an input module 310, and an output module 312. In some embodiments, the input module 310 receives the brake pedal position information from the second diagnostic computing device 116.

In this embodiment, the display generator module 304 generates one or more indications or indicators (e.g., images or graphics) indicating a position of the brake pedal 302 based on the brake pedal position information. In some embodiments, the output module 312 transmits a signal including the indication to the display, and the display 114 displays the one or more indications. In some embodiments, the output module 312 transmits a signal indicating the position of the brake pedal 302, and the display 114 displays an indication or indicator (e.g., by illuminating a green light or a red light) of the position of the brake pedal 302 based on the signal.

In some embodiments, the vehicle computer 300, the second diagnostic computing device 116, and the first diagnostic computing device 110 cooperate to display the indication(s) via the display 114. For example, the vehicle computer 300 may communicate the brake pedal position information to the second diagnostic computing device 116, and the second diagnostic computing device 116 communicates the brake pedal position information to the first diagnostic computing device 110. The display generator module 304 then generates the one or more indications and/or signals indicative of the position of the brake pedal 302 based on the brake pedal position information, and the display 114 displays the one or more indications. As described in greater detail below, the first diagnostic computing device 110 generates testing information such as, for example, results of brake tests conducted on the vehicle 100 such as measured torques and/or force values corresponding to the brake system of the vehicle 100. In some embodiments, the display generator module 304 displays the testing information via the display 114.

The roller controller module 306 controls the rollers 104 of the dynamometer 102 via the roller motor and/or brake system 112. For example, the roller controller module 306 controls rotation of the rollers 104 to permit the front wheels 108 and/or the rear wheels 106 to rotate, prevent the front wheels 108 and/or the rear wheels 106 from rotating, and/or urge the front wheels 108 and/or the rear wheels 106 to rotate when the vehicle 100 is supported on the rollers 104. As described in greater detail below, to test the brakes of the vehicle 100, the roller controller module 306 urges the front wheels 108 and/or the rear wheels 106 to rotate when the brake pedal 302 is actuated (e.g., depressed), and the brake force determiner module 308 determines a brake force generated via the brakes of the vehicle 100 based on a force and/or a torque employed by the rollers 104 when the rollers 104 urge the front wheels 108 and/or the rear wheels 106 to rotate.

While an exemplary implementation of the vehicle 100 and the system 90 are shown in FIG. 3, the vehicle 100 and/or the system 90 may be implemented in other ways without departing from the scope of this disclosure. For example, one or more of the components and/or devices shown in FIG. 3 may be combined, divided, re-arranged, omitted, eliminated and/or implemented in one or more additional and/or alternative ways. The vehicle computer 300, the brake pedal sensor 202, the brake pedal 302, the second diagnostic computing device 116, the dynamometer 102, the first diagnostic computing device 110, the display generator module 304, the roller controller module 306, the brake force determiner module 308, the input module 310, the output module 312, the roller motor and/or brake system 112, and/or the display 114 of FIG. 3 may be implemented via hardware, software, and/or firmware. The vehicle computer 300, the brake pedal sensor 202, the brake pedal 302, the second diagnostic computing device 116, the dynamometer 102, the first diagnostic computing device 110, the display generator module 304, the roller controller module 306, the brake force determiner module 308, the input module 310, the output module 312, the roller motor and/or brake system 112, and/or the display 114 of FIG. 3 may be implemented by one or more circuits, programmable processors, application specific integrated circuits (ASICs), programmable logic devices (PLDs) and/or field programmable logic devices (FPLDs), and/or one or more additional and/or alternative devices. At least one of the vehicle computer 300, the brake pedal sensor 202, the brake pedal 302, the second diagnostic computing device 116, the dynamometer 102, the first diagnostic computing device 110, the display generator module 304, the roller controller module 306, the brake force determiner module 308, the input module 310, the output module 312, the roller motor and/or brake system 112, and/or the display 114 of FIG. 3 includes a tangible and/or non-transitory computer readable medium such as a memory, DVD, CD, etc. storing software and/or firmware. The vehicle 100 and/or the system 90 of FIG. 3 may include one or more additional and/or alternative components and/or devices and/or may include more than one of any or all of the components and/or devices.

Figure 4:
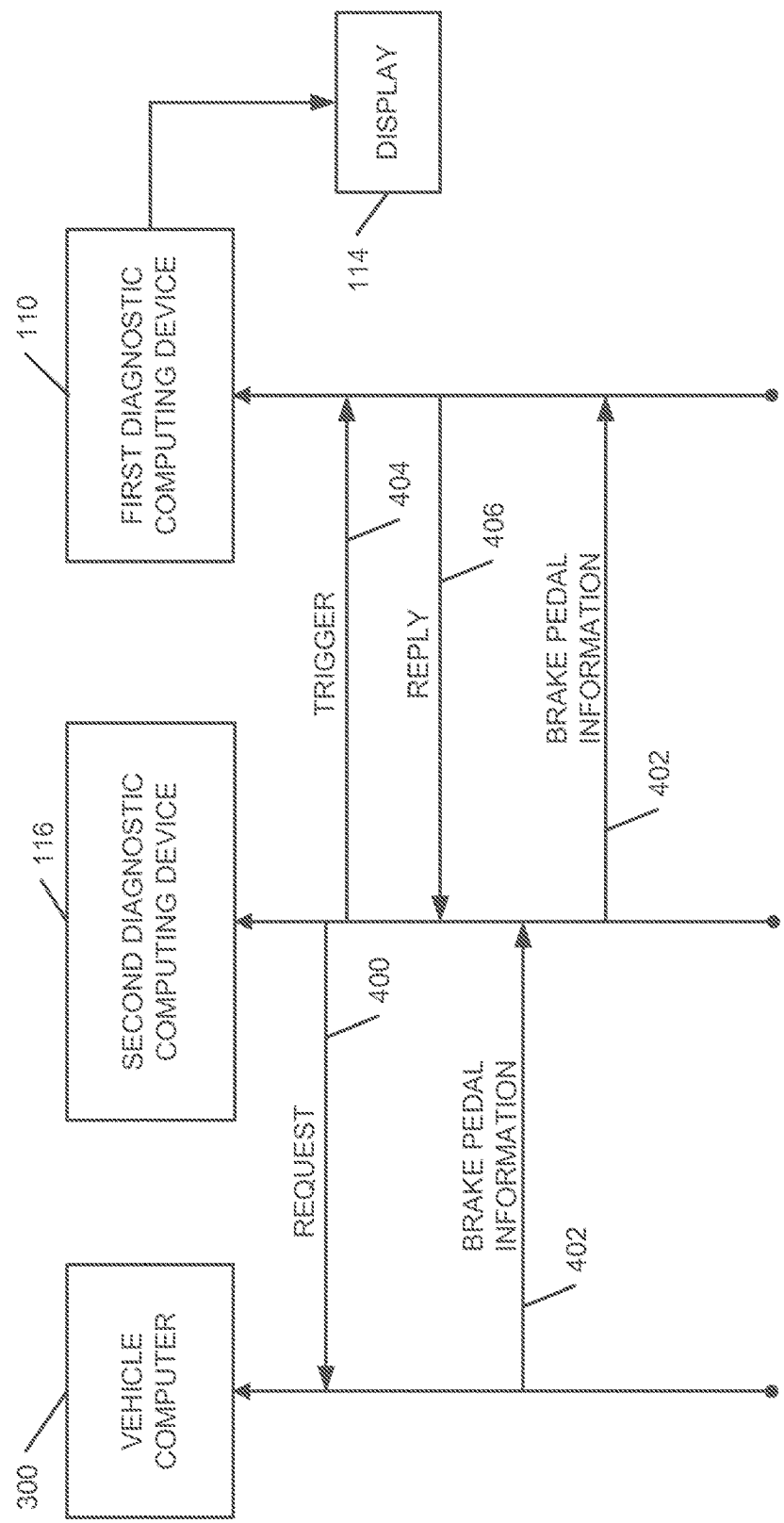
FIG. 4 is a schematic illustrating exemplary communication between a vehicle computer, a first diagnostic computing device, and a second diagnostic computing device of the system of FIG. 3.

FIG. 4 is a schematic view of exemplary communication between the vehicle computer 300, the second diagnostic computing device 116, and the first diagnostic computing device 110 to test the brakes of the vehicle 100. In this embodiment, the second diagnostic computing device 116 communicates a request 400 to the vehicle computer 300 for brake pedal position information 402. In response, the vehicle computer 300 communicates the brake pedal position information 402 to the second diagnostic computing device 116. In this embodiment, the second diagnostic computing device 116 communicates a trigger 404 to the first diagnostic computing device 110. In some embodiments, the trigger 404 may be a signal to initiate a brake test. The first diagnostic computing device 110 communicates a reply 406 via the input module 310 to the second diagnostic computing device 116, and the second diagnostic computing device 116 communicates the brake pedal position information 402 to the first diagnostic computing device 110. The input module 310 receives the brake pedal position information 402. The output module 312 of the first diagnostic computing device 110 then transmits one or more images indicating a position of the brake pedal 302 based on the brake pedal position information 402 to the display 114.

Figure 5:
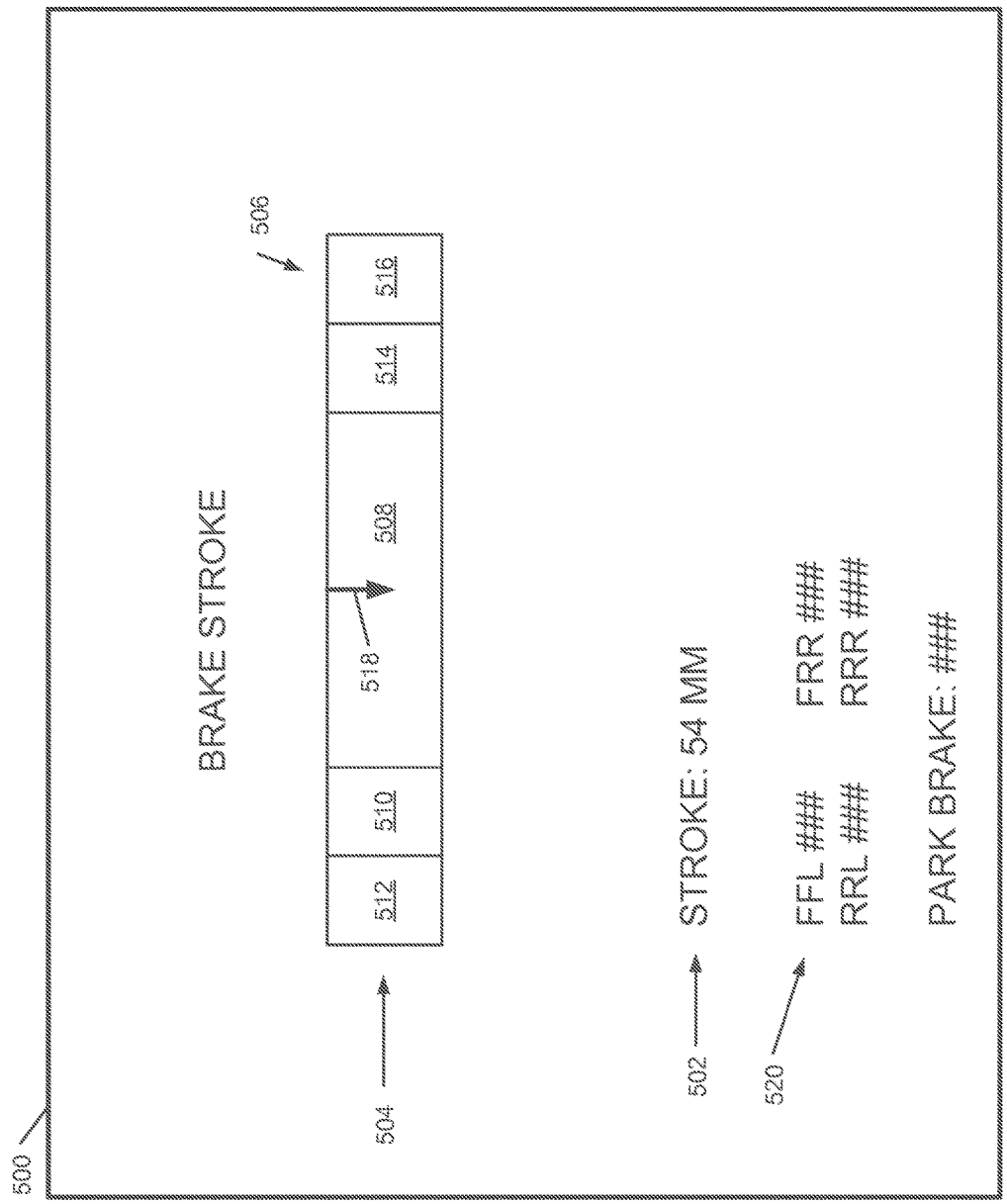
FIG. 5 is a display displaying images indicative of a position of a brake pedal of the vehicle of FIG. 1.

FIG. 5 shows an exemplary display 500, which may be used to implement the display 114 of FIGS. 1, 3, and 4. In this embodiment, the display 500 displays a first image 502 indicative of a position of the brake pedal 302. The first image 502 of FIG. 5 is a labeled value corresponding to a distance of the brake pedal 302 from a fully unactuated position. For example, in this embodiment, the first image 502 is the text, "STROKE: 54 mm," which indicates that the brake pedal 302 is 54 millimeters from the fully unactuated position. In other embodiments, the first image 502 may include one or more additional and/or different indications of the position of the brake pedal 302.

The display 500 of FIG. 5 displays a second image 504 graphically indicating the position of the brake pedal 302 relative to predetermined ranges of brake pedal positions. In the embodiment of FIG. 5, the second image 504 includes a bar 506 having a first area 508 indicative of a first predetermined range of brake pedal positions. In this embodiment, when the brake pedal 302 is in a position within the first predetermined range of brake pedal positions, the brake test is performed. In some embodiments, the first area 508 is a first color to indicate that the brake test is to be conducted when the brake pedal 302 is in a position within the first predetermined range. For example, the first area 508 of the bar 506 may be green.

In some embodiments, the first predetermined range of brake pedal positions includes brake pedal positions 50 millimeters to 60 millimeters from the fully unactuated position of the brake pedal 302. Thus, the brake pedal 302 may be within the first predetermined range of positions when the driver of the vehicle 100 depresses the brake pedal 302 a distance of 50 millimeters to 60 millimeters from the fully unactuated position. However, the above-noted measurements are merely examples. Thus, in other embodiments, the first predetermined range of brake pedal positions may include other positions without departing from the scope of this disclosure. For example, the first predetermined range of brake pedal positions may include brake pedal positions from the fully unactuated position of 25 millimeters to 30 millimeters, 30 millimeters to 50 millimeters, 54 millimeters to 56 millimeters, 65 millimeters to 80 millimeters, and/or any other brake pedal positions. In some embodiments, the first predetermined range of brake pedal positions corresponds to brake pedal positions having different units than millimeters. For example, the first predetermined range of brake pedal positions may correspond to a ratio or percentage of actuation of the brake pedal 302. For example, the first predetermined range of brake pedal positions may be actuation of the brake pedal 302 by 50 percent to 55 percent of a total stroke distance of the brake pedal 302.

When the brake pedal 302 is in a position outside of the first predetermined range of brake pedal positions, a brake test is not performed. In the embodiment shown in FIG. 5, the bar 506 also includes a second area 510, a third area 512, a fourth area 514, and a fifth area 516 indicative of predetermined ranges of brake pedal positions outside of the first predetermined range of brake pedal positions. In this embodiment, the second predetermined range is below the first predetermined range, and third predetermined range is below the second predetermined range. The fourth predetermined range is above the first predetermined range, and the fifth predetermined range is above the fourth predetermined range. Thus, from left to right in the perspective of FIG. 5, the bar 506 includes the third area 512, the second area 510, the first area 508, the fourth area 514, and the fifth area 516. In some embodiments, the second area 510 and the fourth area 514 are a second color indicative of brake pedal positions outside of the first predetermined range. For example, the second area 510 and the fourth area 514 may be yellow. In some embodiments, the third area 512 and the fifth area 516 are a third color indicative of brake pedal positions further outside of the first predetermined range. For example, the third area 512 and the fifth area 516 may be red.

The display 500 includes an indicator 518 indicating the position of the brake pedal 302 relative to the predetermined ranges of brake pedal positions. For example, the indicator 518 of FIG. 5 indicates the position of the break pedal 302 relative to the predetermined ranges of brake pedal positions by being visually associated with one of the areas 508, 510, 512, 514, 516 of the bar 506. For example, the indicator 518 is an arrow disposed in and pointed to the first area 508 of the bar 506. As a result, the indicator 518 of FIG. 5 indicates that the brake pedal 302 is in a position within the first predetermined range of brake pedal positions and, thus, a brake test may be conducted. Although the embodiment of FIG. 5 employs the bar 506 and the indicator 518 to indicate the predetermined ranges of brake pedal positions and the position of the brake pedal 302, respectively, one or more additional and/or alternative images may be displayed to indicate the predetermined ranges of brake pedal positions and/or the position of the brake pedal 302.

In the embodiment of FIG. 5, the display 500 displays third images 520 indicative of results of brake tests conducted on the vehicle 100. For example, the display 500 of FIG. 5 displays torque and/or force values corresponding to each brake (e.g., left front brake, right front brake, left rear brake, right rear brake, and/or park brake) of the vehicle 100 measured during one or more brake tests.

Figure 6:
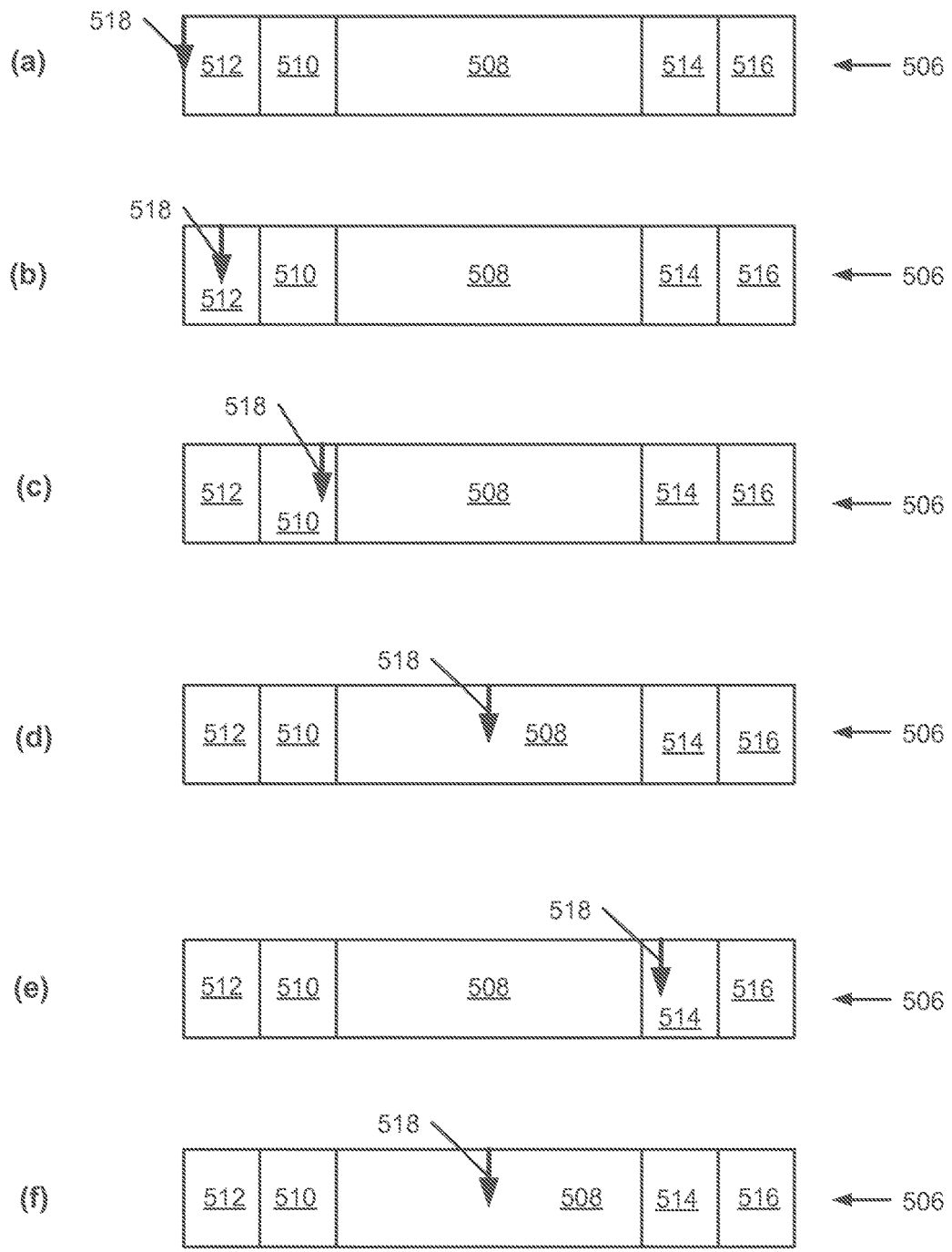
FIG. 6 illustrates images that may be displayed by the display of FIG. 5 to indicate the position of the brake pedal relative to a predetermined range of brake pedal positions.

FIG. 6 shows the example first image 504 of FIG. 5 as the driver of the vehicle 100 actuates the brake pedal 302 to position the brake pedal 302 within the first predetermined range of brake pedal positions to conduct a brake test. When the driver has not yet actuated the brake pedal 302 and, thus, the brake pedal 302 is in the fully unactuated position, the first diagnostic computing device 110 may display the indicator 518 as being on an end of the bar 506 as illustrated in FIG. 6(a). When the driver actuates the brake pedal 302, the vehicle computer 300 communicates brake pedal position information to the second diagnostic computing device 116, which communicates the brake pedal position information to the first diagnostic computing device 110. As a result, the first diagnostic computing device 110 updates the bar 506 and/or the indicator 518 displayed via the display 500 based on the brake pedal position information such that the indicator 518 appears to the driver to move along the bar 506. For example, as shown in FIGS. 6(b) and 6(c), as the driver actuates the brake pedal 302 away from the fully unactuated position, the first diagnostic computing device 110 updates the bar 506 and/or the indicator 518 such that indicator 518 appears to move to the right along the bar 506 from the perspective of FIG. 6. Thus, as the indicator 518 appears to move toward the first area 508, the indicator 518 indicates that the brake pedal 302 is moving into the first predetermined range of brake pedal positions. The driver further actuates the brake pedal 302 until the indicator 518 is displayed within the first area 508 of the bar 506 as shown in FIG. 6(d). Then, the brake test is conducted while the driver maintains the brake pedal 302 in the first predetermined range of brake pedal positions.

If the driver actuates the brake pedal 302 to a position beyond or past the first predetermined range of brake pedal positions, the indicator 518 appears to move into the fourth area 514 of the bar 506 as shown in FIG. 6(e) and/or into the fifth area 516. As a result, the indicator 518 indicates that the driver has moved the brake pedal 302 past the first predetermined range of brake pedal positions. In response, the driver may permit the brake pedal 302 to move towards the fully unactuated position (e.g., by decreasing an amount of pressure applied to the brake pedal 302) until the brake pedal 302 moves back within the first predetermined range of brake pedal positions as indicated by the indicator 518 being displayed within the first area 508 of the bar 506 as shown in FIG. 6(f). Then, the brake test is conducted while the driver maintains the brake pedal 302 in the first predetermined range of brake pedal positions.

Figure 7:
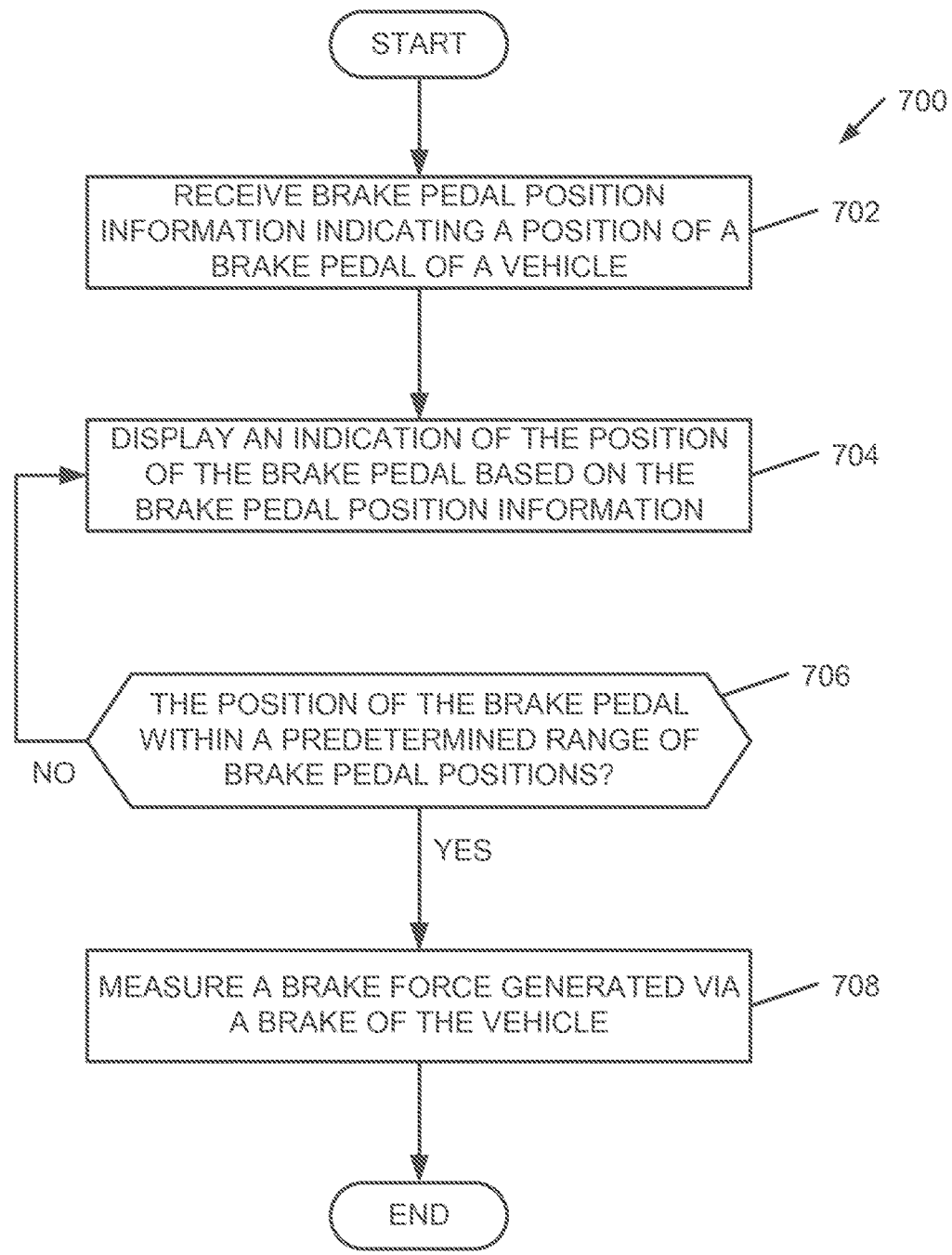
FIG. 7 is a flowchart representative of an exemplary method disclosed herein.
Figure 8:
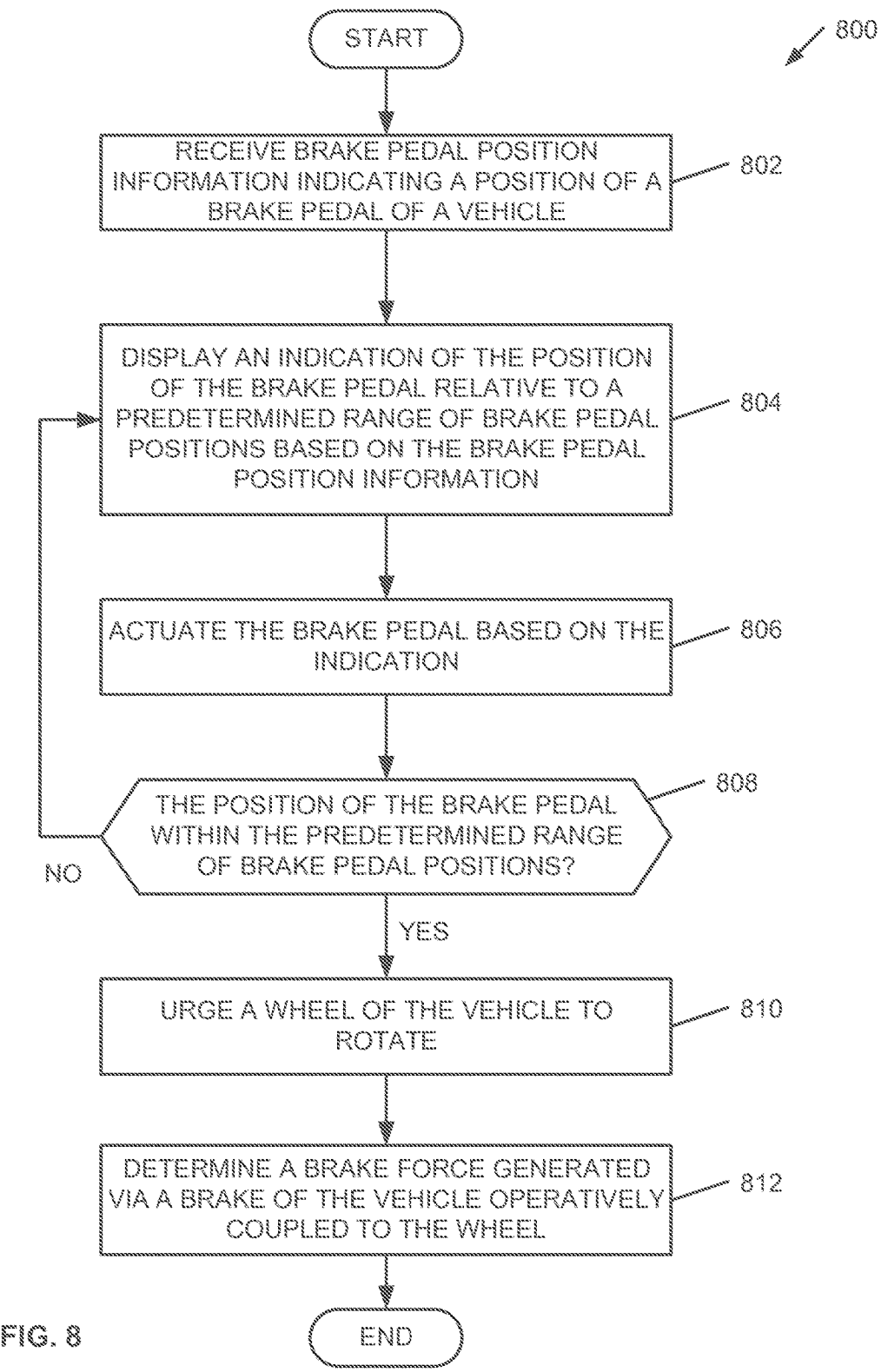
FIG. 8 is a flowchart representative of another exemplary method disclosed herein.

Flowcharts representative of exemplary methods 700, 800 to test a brake system of a vehicle such as, for example, the vehicle 100 of FIG. 1 are shown in FIGS. 7 and 8. The methods 700, 800 of FIGS. 7 and 8 may be implemented using a program for execution by one or more processors such as a processor 902 described in more detail below in conjunction with FIG. 9. However, the entire program and/or portions of the program could be executed by one or more additional and/or alternative devices. The program(s) may be stored on a tangible computer readable medium such as a CD-ROM, a hard drive, a flash drive, a digital versatile disk (DVD), or a memory employed by the processor(s). Further, although the methods 700, 800 of FIGS. 7 and 8 are described with reference to the flowcharts of FIGS. 7 and 8, other methods of implementing the embodiments disclosed herein may be used. For example, the order of the blocks may be different, and/or some of the blocks may be different, eliminated, or combined.

As mentioned above, the exemplary methods 700, 800 of FIGS. 7 and 8 may be implemented using computer readable instructions stored on a tangible computer readable medium. As used herein, a tangible computer readable medium is not a propagating signal. Additionally or alternatively, the methods 700, 800 of FIGS. 7 and 8 may be implemented using computer readable instructions stored on a non-transitory computer readable medium such as a hard drive, a flash drive, a CD-ROM, and/or any other non-transitory storage media in which information is stored. As used herein, a non-transitory computer readable medium is not a propagating signal.

The method 700 of FIG. 7 begins when the first diagnostic computing device 110 receives brake pedal position information indicating a position of the brake pedal 302 of the vehicle 100 (block 702). In some embodiments, the first diagnostic computing device 110 receives the brake pedal position information from the vehicle computer 300 via the second diagnostic computing device 116. The display 114 displays an indication of a position of the brake pedal 302 based on the brake pedal position information (block 704). For example, the display generator module 304 of FIG. 3 may generate the first image 502 of FIG. 5 based on the brake pedal position information, and the display 114 may display the first image 502. In some embodiments, the display 114 is positioned in a field of view of the driver of the vehicle 100 to enable the driver to adjust a position of the brake pedal 302 based on the indication displayed via the display 114.

In the embodiment shown, the first diagnostic computing device 110 determines if the brake pedal 302 is within a predetermined range of brake pedal positions (block 706). For example, the first diagnostic computing device 110 may compare the brake pedal position information to the predetermined range of brake pedal positions to determine if the position of the brake pedal 302 is within the predetermined range of brake pedal positions. In some embodiments, the first diagnostic computing device 110 determines if the position of the brake pedal 302 is within the predetermined range of brake pedal positions based on an input received in the first diagnostic computing device 110. For example, the driver of the vehicle 100 may communicate the input to the first diagnostic computing device 110 via an input device such as, for example, a mouse, a keyboard, and/or one or more additional and/or alternative input devices in communication with the first diagnostic computing device 110. If the first diagnostic computing device 110 determines that the position of the brake pedal 302 is within the predetermined range of brake pedal positions, the dynamometer 102 measures a brake force generated via a brake of the vehicle 100 (block 708). In this embodiment, if the first diagnostic computing device 110 determines that the position of the brake pedal 302 is not within the predetermined range of brake pedal positions, the method 700 returns to block 704, and the display 114 displays an updated indication of the position of the brake pedal 302 based on brake pedal position information communicated from the vehicle computer 300 to the first diagnostic computing device 110 via the second diagnostic computing device 116.

FIG. 8 is a flowchart representative of another exemplary method 800 to test one or more brakes of a vehicle such as, for example, the vehicle 100 of FIG. 1. The method 800 of FIG. 8 begins when the first diagnostic computing device 110 receives brake pedal position information indicating a position of the brake pedal 302 of the vehicle 100 (block 802). In some embodiments, input module 310 of the first diagnostic computing device 110 receives the brake pedal position information from the vehicle computer 300 via the second diagnostic computing device 116. The display 114 displays an indication of a position of the brake pedal 302 relative to a predetermined range of brake pedal positions based on the brake pedal position information (block 804). For example, the display generator module 304 of FIG. 3 may generate the bar 506 and the indicator 518 of FIGS. 5 and 6 based on the brake pedal position information, the output module 312 may transmit a signal to the display 114 including the bar 506 and the indicator 518, and the display 114 may display the bar 506 and the indicator 518 to indicate the position of the brake pedal 302 relative to the first predetermined range of brake pedal positions. In some embodiments, the display 114 is positioned in a field of view of the driver of the vehicle 100. As a result, the driver actuates the brake pedal 302 based on the indication (block 806). For example, the driver may depress or release the brake pedal 302 to cause the indicator 518 to move into the first area 508 of the bar 506, which corresponds to brake pedal positions within the first predetermined range of brake pedal positions, as described above with reference to FIG. 6.

In the embodiment of FIG. 8, the first diagnostic computing device 110 determines if the position of the brake pedal 302 is within the first predetermined range of brake pedal positions (block 808). For example, the first diagnostic computing device 110 may compare the brake pedal position information to the first predetermined range of brake pedal positions to determine if the position of the brake pedal 302 is within the first predetermined range of brake pedal positions. In some embodiments, the first diagnostic computing device 110 determines if the position of the brake pedal 302 is within the first predetermined range of brake pedal positions based on an input received in the first diagnostic computing device 110. For example, the driver of the vehicle 100, upon viewing the indicator 518 within the first area 508 of the bar 506 (FIGS. 5 and 6), may communicate the input to the first diagnostic computing device 110 via an input device such as, for example, a mouse, a keyboard, and/or one or more additional and/or alternative input devices in communication with the first diagnostic computing device 110. If the first diagnostic computing device 110 determines that the position of the brake pedal 302 is within the first predetermined range of brake pedal positions, the dynamometer 102 urges one or more of the wheels 106, 108 to rotate (block 810). For example, the first diagnostic computing device 110 of the dynamometer 102 may communicate a command to the roller motor 112 to rotate one or more of the rollers 104 while the driver maintains the brake pedal 302 within the first predetermined range of brake pedal positions. The dynamometer 102 determines a brake force generated via a brake of the vehicle 100 (block 812). For example, the dynamometer 102 may determine the brake force by determining a force and/or a torque applied to and/or by one or more of the rollers 104. In some embodiments, the first diagnostic computing device 110 determines if the brake force is less than a predetermined brake force. For example, the first diagnostic computing device 110 may compare the brake force determined at block 812 to the predetermined brake force, which may be stored in a memory of the first diagnostic computing device 110. In some embodiments, the first diagnostic computing device 110 determines if the brake force is equal to or greater than the predetermined brake force. In this embodiment, if the first diagnostic computing device 110 determines that the position of the brake pedal 302 is not within the first predetermined range of brake pedal positions at block 808, the method 800 of FIG. 8 returns to block 804, and the display 114 displays an updated indication of the position of the brake pedal 302 based on brake pedal position information communicated from the vehicle computer 300 to the first diagnostic computing device 110 via the second diagnostic computing device 116.

Figure 9:
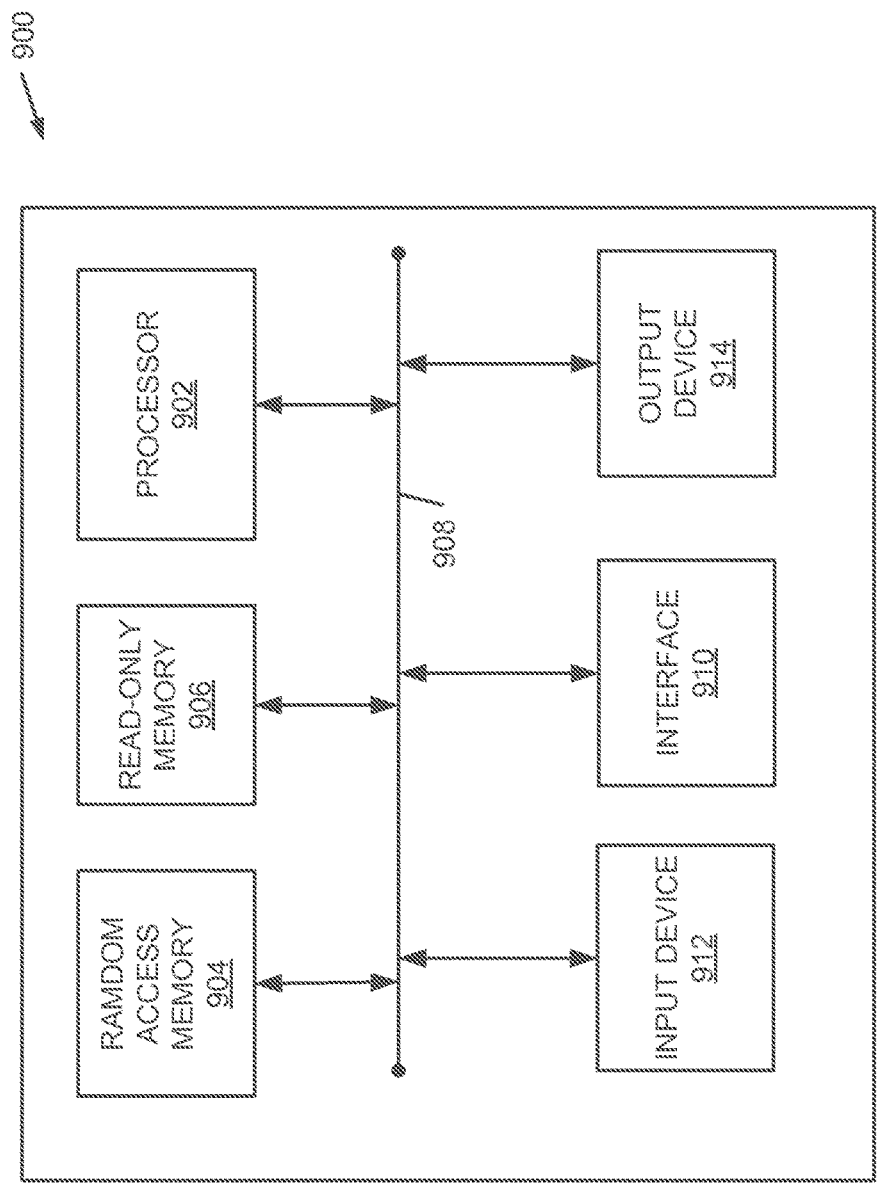
FIG. 9 is a processor platform that may be used to execute machine-readable instruction to implement the embodiments disclosed herein.

FIG. 9 is a schematic view of an exemplary processor platform 900 that may be used to execute instructions to implement the method 700 of FIG. 7 and/or the method 800 of FIG. 8 and/or to implement the vehicle computer 300, the brake pedal sensor 202, the brake pedal 302, the second diagnostic computing device 116, the dynamometer 102, the first diagnostic computing device 110, the display generator module 304, the roller controller module 306, the brake force determiner module 308, the input module 310, the output module 312, the roller motor and/or brake system 112, and/or the display 114 of FIG. 3. In some embodiments, the processor platform 900 is implemented via one or more general-purpose processors, processor cores, microcontrollers, and/or one or more additional and/or alternative processing devices.

The processor platform 900 of FIG. 9 includes a programmable, general purpose processor 902. The processor 902 executes coded instructions within a random access memory 904 and/or a read-only memory 906. The coded instructions may include instructions executable to implement the methods 700, 800 of FIGS. 7 and 8. The processor 902 may be any type of processing device, such as a processor core, a processor and/or a microcontroller. The processor 902 is in communication with the random access memory 904 and the read-only memory 906 via a communications bus 908. The random access memory 904 may be implemented by any type of random access memory device such as, for example, DRAM, SDRAM, etc. The read-only memory 906 may be implemented by any type of memory device such as, for example, flash memory. In some embodiments, the processor platform 900 includes a memory controller to control access to the random access memory 904 and/or the read-only memory 906. The processor platform 900 of FIG. 9 includes an interface 910. The interface 910 may be implemented by an interface standard such as, for example, an external memory interface, a serial port, a general-purpose input/output, and/or any other type of interface standard. The processor platform 900 of FIG. 9 includes at least one input device 912 and at least one output device 914 coupled to the interface 910.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Additionally, the features of various implementing embodiments may be combined to form further embodiments. The word "exemplary" is used herein to mean serving as an example, instance, or illustration. Any aspect or embodiment described herein as "exemplary" is not to be construed as preferred or advantageous over other aspects or embodiments.

What is claimed is:

1. A system, comprising:
   a first diagnostic computing device;
   a second diagnostic computing device configured to be in communication with the first diagnostic computing device and a computing device of a vehicle, the second diagnostic computing device configured to communicate brake pedal position information to the first diagnostic computing device; and
   a display in communication with the first diagnostic computing device, the display configured to indicate a current position of a brake pedal of the vehicle relative to a first predetermined range of brake pedal positions and relative to a second predetermined range of brake pedal positions based on the brake pedal position information, wherein the first predetermined range of brake pedal positions and the second predetermined range of brake pedal positions are non-overlapping ranges between a fully unactuated position and a fully actuated position.

2. The system of claim 1 further comprising a brake pedal sensor operatively coupled to the vehicle, the brake pedal sensor configured to generate the brake pedal position information.

3. The system of claim 1, wherein the display is configured to:
- display an image including an indication of the position of the brake pedal being visually associated with a first area of the image outside of the first predetermined range of brake pedal positions; and
- update the image to display the indication being visually associated with a second area of the image when the position of the brake pedal is within the first predetermined range of brake pedal positions.

4. The system of claim 1, further comprising a dynamometer including or operatively coupled to the first diagnostic computing device.

5. The system of claim 4, wherein the first diagnostic computing device is configured to control operation of the dynamometer.

6. The system of claim 1, wherein the second diagnostic computing device is a line-end tester.

7. The system of claim 1, further comprising the vehicle.

8. A method, comprising:
- receiving, in a dynamometer, brake pedal position information, the brake pedal position information indicating a current position of a brake pedal operatively coupled to a vehicle;
- displaying, via a display in communication with the dynamometer, an image indicating a first predetermined range of brake pedal positions, wherein the first predetermined range of brake pedal positions and the second predetermined range of brake pedal positions are non-overlapping ranges between a fully unactuated brake position and a fully actuated brake position;
- displaying, via the display, an indication of the current position of the brake pedal based on the brake pedal position information, wherein the indication is visually associated with the image to indicate the current position of the brake pedal relative to the first predetermined range of brake pedal positions and the second predetermined range of brake pedal positions;
- updating the display based on brake pedal position information as the current position of the brake pedal is adjusted; and
- determining a brake force generated via a brake of the vehicle when the current position of the brake pedal is within the first predetermined range of brake pedal positions and outside of the second predetermined range of brake pedal positions.

9. The method of claim 8, wherein determining the brake force when the position of the brake pedal is within the first predetermined range of brake pedal positions comprises determining the brake force when the brake pedal is not in a fully actuated position.

10. The method of claim 9, further comprising moving the brake pedal from a first position to a second position based on the indication and the image, the first position outside of the first predetermined range of brake pedal positions, the second position within the first predetermined range of brake pedal positions.

11. The method of claim 8, farther comprising determining if the brake force is one of less than, equal to, or greater than a predetermined brake force.

12. The method of claim 8, wherein determining the brake force comprises urging a wheel of the vehicle to rotate.

13. The method of claim 8 further comprising:
- receiving, in a line-end tester in communication with a computing device of the vehicle, the brake pedal position information; and
- communicating the brake pedal position information from the line-end tester to the dynamometer.

14. A diagnostic computing device comprising:
- an input module configured to receive brake pedal position information;
- an output module configured to transmit a signal to a display to display an indication that a current position of a brake pedal of a vehicle is within a first predetermined range of brake pedal positions and outside a second predetermined range of brake pedal positions, wherein the first predetermined range of brake pedal positions and the second predetermined range of brake pedal positions are non-overlapping ranges between a fully unactuated position and a fully actuated position; and
- a brake force determiner module configured to determine a brake force generated via a brake of the vehicle when the position of the brake pedal is within the first predetermined range of brake pedal positions.

15. The diagnostic computing device of claim 14 further comprising a display generator module configured to generate the indication based on the brake pedal position information.

16. The diagnostic computing device of claim 15, wherein the display generator is configured to visually associate the indication with an area of an image to indicate the current position of the brake pedal relative to the first predetermined range of brake pedal positions.

17. The diagnostic computing device of claim 14, further comprising:
- a line-end tester in communication with a computing device of the vehicle, wherein the line-end tester receives the brake pedal position information from the computing device and communicates the brake pedal position information to a dynamometer.

* * * * *